United States Patent
Delzeit et al.

(10) Patent No.: US 7,704,547 B1
(45) Date of Patent: Apr. 27, 2010

(54) CARBON NANOTUBE GROWTH DENSITY CONTROL

(75) Inventors: Lance D. Delzeit, Sunnyvale, CA (US); John F. Schipper, Palo Alto, CA (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 705 days.

(21) Appl. No.: 11/472,516

(22) Filed: Jun. 20, 2006

Related U.S. Application Data

(63) Continuation-in-part of application No. 11/007,913, filed on Dec. 7, 2004.

(51) Int. Cl.
  C23C 16/52 (2006.01)
  C23C 16/00 (2006.01)
(52) U.S. Cl. .................. 427/8; 427/248.1; 427/585; 977/742
(58) Field of Classification Search ............... 427/248.1, 427/8, 585
  See application file for complete search history.

(56) References Cited

U.S. PATENT DOCUMENTS

| | | | |
|---|---|---|---|
| 6,277,318 B1 | 8/2001 | Bower et al. | |
| 6,331,209 B1 | 12/2001 | Jang et al. | |
| 6,333,016 B1 | 12/2001 | Rasasco et al. | |
| 6,858,197 B1 | 2/2005 | Delzeit | |
| 2003/0004058 A1* | 1/2003 | Li et al. | 502/258 |
| 2004/0070326 A1* | 4/2004 | Mao et al. | 313/311 |
| 2007/0032046 A1 | 2/2007 | Dmitriev et al. | |
| 2008/0090183 A1 | 4/2008 | Zhu et al. | |

OTHER PUBLICATIONS

Parent Case, Application Filed Dec. 7, 2004, U.S. Appl. No. 11/007,913, Office Action dated Jul. 15, 2008, 9 pages.
Response to nonfinal action, mailed Jul. 15, 2008, in parent case, U.S. Appl. No. 11/007,913, filed Dec. 7, 2004.

* cited by examiner

*Primary Examiner*—Shamim Ahmed
(74) *Attorney, Agent, or Firm*—John F. Schipper; Robert M. Padilla

(57) ABSTRACT

Method and system for combined coarse scale control and fine scale control of growth density of a carbon nanotube ("CNT") array on a substrate, using a selected electrical field adjacent to a substrate surface for coarse scale density control (by one or more orders of magnitude) and a selected CNT growth temperature range for fine scale density control (by multiplicative factors of less than an order of magnitude) of CNT growth density. Two spaced apart regions on a substrate may have different CNT growth densities and/or may use different feed gases for CNT growth.

14 Claims, 13 Drawing Sheets

US 7,704,547 B1

CARBON NANOTUBE GROWTH DENSITY CONTROL

CROSS REFERENCE TO RELATED APPLICATIONS

This Application is a Continuation In Part of "Control Of Carbon Nanotube Density And Tower Height In An Array," U.S. Ser. No. 11/007,913, filed 7 Dec. 2004.

ORIGIN OF THE INVENTION

This invention was made, in part, by one or more employees of the U.S. government. The U.S. government has the right to make, use and/or sell the invention described herein without payment of compensation therefor, including but not limited to payment of royalties.

FIELD OF THE INVENTION

This invention relates to control of growth density of carbon nanostructures.

BACKGROUND OF THE INVENTION

In 1991, S. Iijima (Nature, vol. 354: 56-58) reported growth of multi-wall coaxial nanotubes, containing 2-50 layers with radial separations of about 0.34 nm, using an arc discharge evaporation method similar to that used for Fullerene synthesis. The nanotubes originally observed by Iijima were formed on the negative voltage end of a carbon electrode and were plentiful in some regions and sparse in other regions. Since that time, other workers have developed other discharge means for controlled deposition of graphitic carbon. However, it is not straightforward to control the growth of, or density of, single wall nanotubes ("SWCNTs"), multi-wall nanotubes ("MWCNTs") and/or carbon-based nanofibers ("CNFs").

Recently, interest has grown in use of arrays of carbon nanotubes ("CNTs") as an intermediary for transport of electrical particles (e.g., electrons) and/or transport of thermal energy from one body to another. For example, a CNT array may be used for dissipation of thermal energy or accumulated electrical charge associated with operation of an electronics device or system. However, the device or system connected to the CNT array(s) may require use of different CNT array densities in different regions, because of differing transport requirements. Use of a mask to discriminate between a CNT growth region and a no-growth region has been demonstrated. However, this approach only produces different regions where CNTs are present (with a substantially constant density) and where CNTs are absent (density substantially 0). Where maximum thermal transport is a focus, the desired CNT density is likely to be as high as possible, and no other limit is of concern. However, where electrical transport is a focus (e.g., between adjacent signal processing components on a semiconductor chip, the desired CNT density may lie in an intermediate range, with both a lower bound and an upper bound.

What is needed is an approach that allows control of CNT growth density on a coarse scale and on a fine scale simultaneously, preferably with two or more substantially different and adjustable scales (coarse and fine) for the CNT density. The CNT density is allowed to vary from one location to another, if desired. Preferably, the approach should allow variation and control, over a factor of about 1-1000, in the coarse scale local CNT density and should allow variation and control over a factor of about 1-10 in the fine scale local CNT density.

SUMMARY OF THE INVENTION

These needs are met by the invention, which provides control or influence of CNT growth density on a relatively coarse scale, with density adjustment over several orders of magnitude, using an applied electrical field or voltage difference, aligned substantially perpendicular to the substrate surface adjacent to the surface during growth. Control or influence of CNT growth density on a finer scale, estimated at a factor of 2-10, is provided using temperature control for the CNT growth process. For example, application of a modest electrical field of between 5 and 20 volts over a transverse electrode-to-electrode gap of about 25 µm (electrical field value $|E|=(2-8)\times 10^3$ volts/cm) is estimated to change CNT growth density by 1-3 orders of magnitude (coarse scale); and variation of CNT source average temperature between T=700° C. and T=850° C. is estimated to change CNT growth density by a multiplicative factor of 2-10 (fine scale).

A first region may have a first range of CNT densities and an adjacent second region, spaced apart from the first region, may have a second range of CNT densities that partly overlaps, or has no overlap with, the first density range. The second region has a higher CNT density and uses variable heating and/or a reduced electrical field to provide the higher CNT density, based on an experimentally determined growth curve and experimental configuration of a device (CNT density versus temperature). This approach should be distinguished from masking of regions on a substrate, where the result is binary: either a CNT array with a fixed density appears, or no CNTs appear in the region.

DESCRIPTION OF BEST MODES OF THE INVENTION

Figure 1:
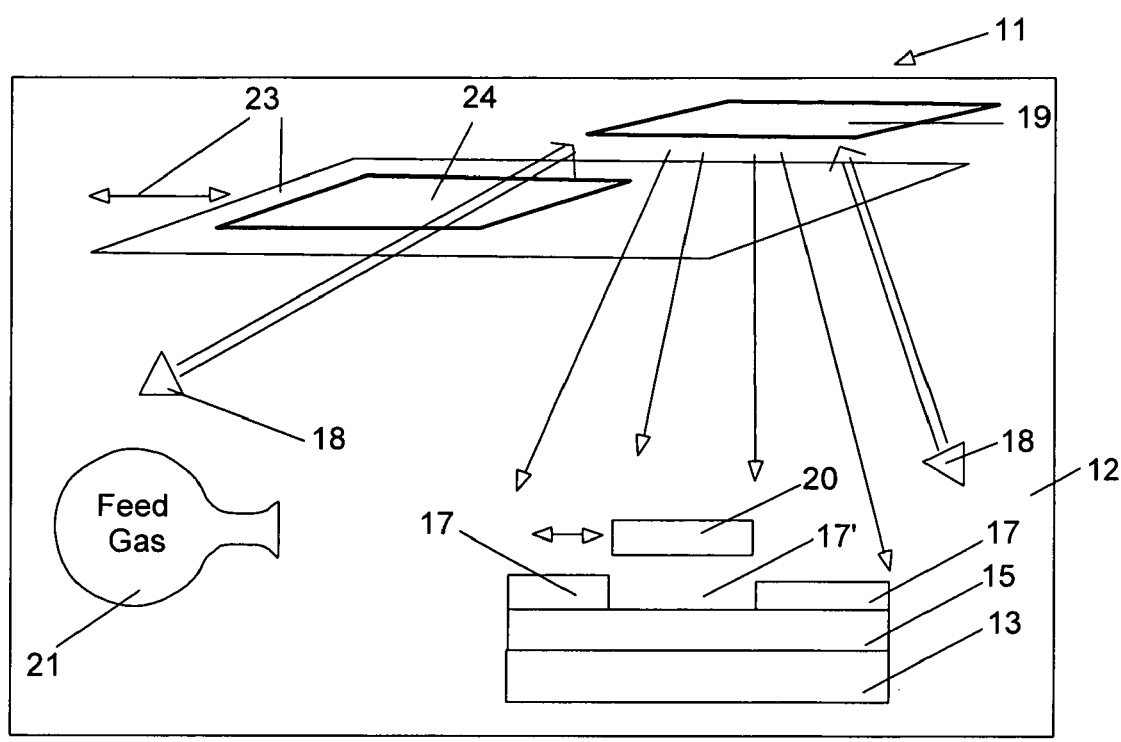
FIG. 1 illustrates a system for generating and controlling the growth of an SWCNT or an MWCNT, depending upon the choice of several parameters.

FIG. 1 illustrates a system 11 for generating and controlling patterned growth of an array of CNTs. A substrate 13, located in a chamber 12, is coated with a first layer 15 (optional) of a selected first metal, preferably Al and/or Ir, having a thickness of at least 1-10 nm (for Al) or 5-20 nm (for Ir). A thicker first layer can be used but does not produce any significant further changes in the array thus produced. Optionally, the first layer 15 has a multi-layer structure, including a first sub-layer 15A of a metal or alloy, such as Pt, Pd, Cr, Mo, Ti and/or W, with selected electrical conductivity properties, and a second sub-layer 15B, preferably Al (thickness $\geq$1-10 nm) and/or Ir (thickness $\geq$5-20 nm), that provides a substructure for a catalyst layer 17 of Fe, Ni, Co Mo and/or Pd or a similar material. Use of a second sub-layer 15B also allows growth of SWCNTs, MWCNTs and CNFs on a (coated) substrate that need not be compatible with the catalyst. An example is use of highly oriented pyrolytic graphite (HOPG) or amorphous carbon on the substrate. For convenient reference, the optional first layer 15 will be referred to as the "first layer," whether the structure is single-layer or multi-layer, except where details of this layer are important.

One or more ion sources 18 (e.g., ion guns) provide ion beams that are directed at a metal sputtering source 19 that produces particles of a selected metal, such as Fe, Co, Ni, Mo or Pd that forms a catalyst layer 17, having a preferred thickness of 0.1-20 nm, on the first layer 15. Two or more metals can be deposited simultaneously or sequentially as part of the first layer 15 and/or the second layer 17, using one or more sputtering sources.

If the support structure 13/15/17 is to promote a patterned array of carbon nanotubes, a mask 20 is positioned between the sputtering source 19 and the first layer 15 to prevent the catalyst layer 17 from forming at selected locations. The mask 20 creates a "shadow" on the first layer 15, preventing the catalyst layer 17 from forming and producing a "void" 17' where the catalyst material would otherwise appear.

The mask 20 can be a shadow mask that is positioned over the substrate 13 (or over the substrate 13 plus first layer 15) by the adherence of molecules to the substrate surface, with selected regions of the adherence molecules removed, as occurs with photolithography and e-beam lithography; or by the addition of other self-assembling molecules, such as proteins or lipid layers or small metal particles held in place within a biological or chemical molecule and positioned onto a surface in a two-dimensional or three-dimensional array.

A second layer 17, having a thickness at least equal to 0.1-20 nm, may be used here. The active catalyst may include a co-catalyst, such as a small amount of Mo or Pd in addition to the Fe, Co and/or Ni, or a mixture thereof, especially in the absence of an Al and/or Ir first layer 15, in order to promote a higher density of the SWCNTs in the array. The second layer 17 catalyzes the required chemical reaction(s) and may be deposited using ion beam sputtering from an ion source 19 located adjacent to the substrate 13. The substrate may be Si, porous Si, amorphous carbon, highly oriented pyrolytic graphite (HOPG), an AFM cantilever, fused quartz, zeolite, mica, selected ceramics, selected polymers, selected metals, natural minerals or any similar material. Provision of the first layer 15 enhances electrical conductivity associated with the carbon nanotube and also helps prevent lift-off of the catalyst in the second layer 17 from the substrate 13.

In one approach, a pattern including one or more catalysts in the second layer 17 is deposited in one chamber, and the system 11 is moved to a second chamber for growth of the carbon nanotubes. In another approach, catalyst deposit and patterned carbon nanotube growth occur in the same chamber.

A feed gas source 21 within the chamber 12 (e.g., a quartz tube) provides a heated gas, such as $CH_4$ at a temperature in the range T=800-1100° C., at a selected gas flow rate, such as 1000 sccm. A relatively inert carrier gas, such as Ne or Ar or Xe or Kr or $N_2$, is optionally used to transport the heated gas across the coated support structure 13/15/17, and the coated support structure successively strips the hydrogen atoms from the heated gas to ultimately produce C particles (bare C atoms and C molecules, etc.) that are received at, and accumulate on, a portion of the coated substrate and contribute to the growth of SWCNTs, according to the catalyst pattern deposited on the substrate. If the heated gas temperature adjacent to the coated support structure 13/15/17 drops substantially below T=800° C., for example, to T$\approx$750° C., the growth of SWCNTs will substantially stop. The gas $CH_4$ requires use of a relatively high temperature (T=800-1100° C.) in order to promote H atom stripping to produce substantially "bare" C atoms and molecules. The chamber temperature is then dropped to or below T$\approx$300° C. before the coated substrate and SWCNT growth array are exposed to air.

A shutter or similar mechanism 23 and aperture 24 are positioned between the sputtering source 19 and the feed gas source 21. The shutter 23 is opened and the mask 20 is positioned when the sputtering source 19 is to be used to deposit a first layer 15 or second layer 17 of material on the substrate 13 for purposes of subsequent growth of carbon nanotubes. When this deposit has ended and the feed gas is to be admitted into the chamber 12, the shutter 23 is closed, and the gun(s) 18 and mask 20 are removed or hidden, to protect the sputtering source and mask surfaces from deposit of carbon thereon.

Provision of a first layer 15 allows deposit of a second layer that may otherwise be chemically inconsistent with, or be poisoned by, the underlying substrate or first sub-layer. Provision of the first layer, or of a sequence of sub-layers for the first layer, can also modify the electrical conductivity properties of the finished carbon nanotube array.

If the first layer 15 is omitted, the second layer thickness is no more than about 1 nm and the substrate surface is free of scratches and similar imperfections, no SWCNTs will form on the substrate coated only with the second layer 17. If the substrate 13 has some scratches or imperfections in a given region, a few isolated SWCNTs may grow there, even if the first layer 15 is absent, but control of CNT growth density is not possible here.

Adding the first coating layer 15, with a first layer thickness of at least 5 nm of Ir or of at least 1 nm of Al or a mixture thereof, to the substrate 13, increases the density and the uniformity of growth of the SWCNTs thereon. Addition of a small amount of Mo ($\approx$0.2 nm thickness) to the second layer 17 as a co-catalyst will increase the density of SWCNTs, where the first layer includes Ir, and has no noticeable effect on density, where the first layer contains only Al. The density of SWCNTs can be controlled and ranges from isolated SWCNTs, to a discrete uniform array, to discrete thick ropes, to a dense matte of SWCNT ropes.

The pattern of SWCNTs thus grown is determined by the pattern of the catalyst(s) deposited on the substrate coated with the first layer. The catalyst(s) can be deposited using ion sputtering from an Al or Ir source or can be deposited using arc discharge of a source, laser ablation of a source, chemical vapor deposition (CVD) from a suitable source, or a suitable metal evaporation method. The catalyst can be patterned using a mask with suitably detailed apertures that is pressed against the substrate 13, to provide a first layer pattern, and/or against the first layer 15, to provide a second layer pattern, before the next layer is formed. The mask pattern may be a regular or irregular array of polygonal or curvilinear apertures.

The diameter of SWCNTs varies from 0.9 to 2.7 nm (more generally, from 0.5 to 5 nm), and most CNTs have a diameter of about 1.3 nm. In a growth of one array of 48 SWCNTs, the diameter distribution was found to be about 10 percent at 0.9 nm, 44 percent at 1.3 nm, 29 percent at 1.8 nm, 10 percent at 2.2 nm and 6 percent at 2.7 nm. The length of an SWCNT is difficult to determine, because most SWCNTs do not have sufficient strength to support a substantial, vertically oriented tower (perpendicular to the local plane of the substrate).

Figure 2:
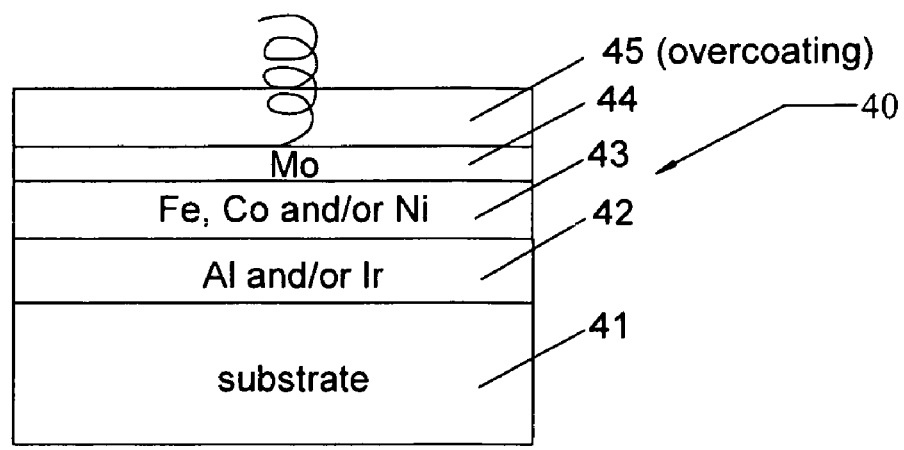
FIG. 2 schematically illustrates a four-layer structure, used to grow coated SWCNTs.

FIG. 2 schematically illustrates a five-layer support structure 40 that can also be used to grow SWCNTs. The structure 40 includes a substrate 41, a bottom layer 42 of Al (thickness $\geq$5 nm), a second layer 43 of Fe, Co and/or Ni (thickness $\geq$10 nm), a third layer 44 of Mo (thickness $\geq$0.2 nm) and a fourth layer 45 of Al (thickness $\geq$1-10 nm). Where a SWCNT is grown from the support structure 40, a portion or all of the carbon nanotube is often coated with Al, providing a fifth overcoating layer 45 This indicates that, by providing an overcoating layer 45 for a more standard four-layer structure (41/42/43/44) and choosing the overcoating material to be compatible with the growth process, coated carbon nanotubes can be grown. Overcoating materials that appear to be compatible with carbon include Al, Ir, Ga, In, Tl, Au, Ag, Zn and/or Cd.

Figure 3:
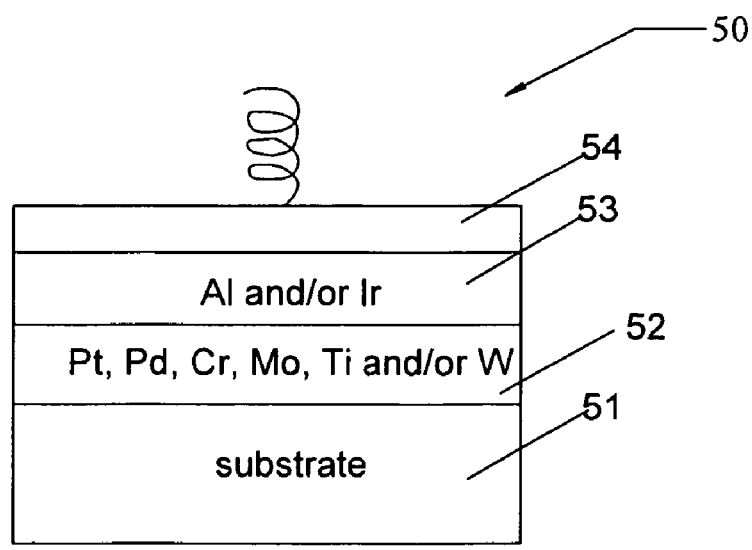
FIG. 3 schematically illustrates a structure having one, two or three layers, used to grow CNTs.

FIG. 3 schematically illustrates a structure 50 for growing carbon nanotubes, having a substrate 51, a first layer 52 of Pt, Pd, Cr, Mo, Ti and/or W or a material with similar structure, a second layer 53 of Al or Ir, and a third layer 54 of Fe, Co or Ni (thickness 0.1-20 nm). Where the structure 51 has the composition Pt/Al/Fe, the measured resistance of a CNF array on this structure is as low as 30 Ohms. Provision of a metal under-layer, such as Pt, Pd, Cr, Mo, Ti and/or W, dramatically lowers the electrical resistance associated with a CNF grown on such a structure. Where a corresponding structure is provided having one layer 52 or two layers, 52 and 54, each of thickness $\geq$10 nm, on a substrate 51, as shown schematically in FIG. 3, the measured electrical resistance is much higher. Table 1 sets forth some multi-layer structures, each layer having a thickness 10 nm, and the estimated corresponding electrical resistances across a 5 mm separation distance of the CNF array.

TABLE 1

Electrical Resistance Associated With A CNF Structure

| Underlying Structure | Resistance (Ohms) |
|---|---|
| Pt/Al/Fe | 30 |
| Pt/Fe | 50 |
| Ti/Fe | 500 |
| Al/Fe | 1,000 |
| Fe | 10,000 |

Table 1 illustrates the dramatic reduction in electrical resistance that results from provision of an underlayer of a metal or alloy, such as Al, Ir, Pt, Pd, Cr, Mo, Ti and/or W, as part of the growth structure for a CNF array (with similar results being obtained for SWCNTs and MWCNTs).

The system 11 in FIG. 1 can also be used to generate and control the growth of a patterned array of SWCNTs and MWCNTs. For MWCNTs and CNFs, presence of a metal underlayer 15 is not required, but may be included. The substrate 13 located in the chamber 14 is optionally coated with a first layer 15 of a selected first metal, preferably Al and/or Ir, having a thickness of at least 1-20 nm. The substrate 13 and optional first layer 15 are coated with a second layer 17 of a selected catalyst, such as Fe, Co and/or Ni, having a thickness of 0.1-20 nm in a desired pattern. A thicker second layer 17 may be used here. Optionally, the active catalyst includes a co-catalyst, such as a small amount of Mo in addition to the Fe, Co and/or Ni. The first layer 15, if present, may be deposited using ion beam sputtering from a first layer source 19 located adjacent to the substrate 13, or using arc discharge, laser ablation, CVD or evaporation. The catalyst(s) in the second layer 17 is preferably provided using ion beam sputtering, arc discharge or laser ablation with a suitable catalyst source 19 and a suitably apertured mask.

A source 21 within the chamber 12 in FIG. 1 provides a heated gas, preferably $C_2H_n$ with n=2 or 4 at a temperature in the range T=650-900° C. The heated gas moves across the support structure 13/15/17, which successively strips the hydrogen atoms from the heated gas to ultimately produce C particles (C atoms, C–C, C=C, C+C molecules, etc.) that are received at, and accumulate on, a portion of the coated substrate and contribute to the patterned growth of MWCNTs. If the heated gas temperature drops substantially below T=650° C., for example, to T≈600° C., the growth of MWCNTs will stop. Use of the gas $C_2H_4$ allows use of a somewhat lower temperature (T=650-900° C.) in order to promote H atom stripping to produce C particles.

Figure 4A:
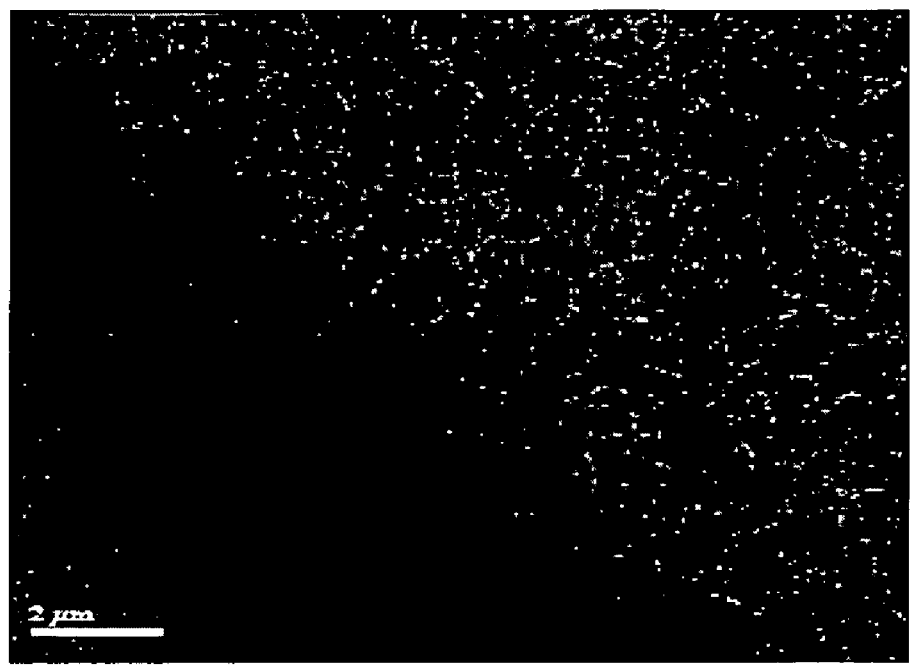
FIGS. 4A-4C are photomicrographs showing well defined carbon nanotube growth regions adjacent to mask edges, for an SWCNT, and MWCNT and a CNF, respectively.
Figure 4B:
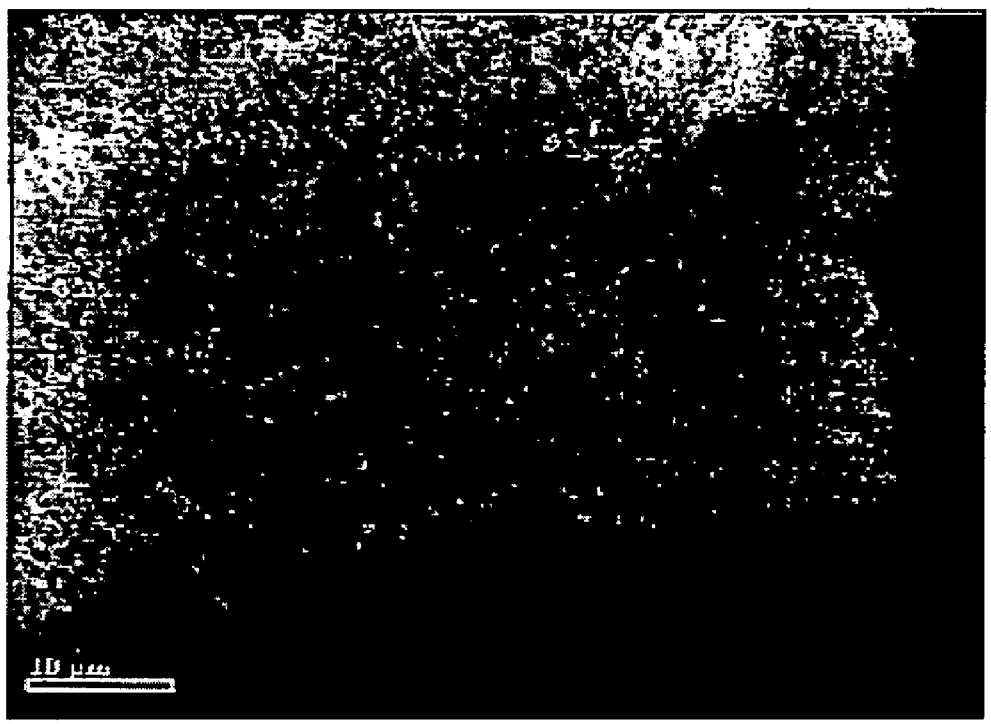
Figure 4C:
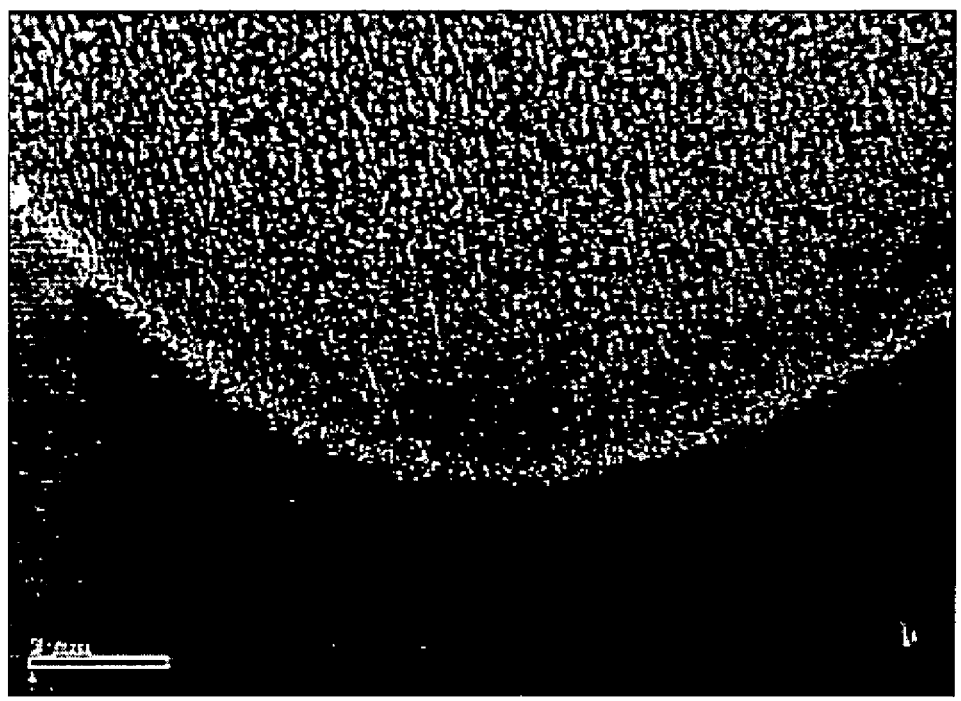

A mask in the form of a 400 mesh grid can be positioned on the support structure 13/15/17, and MWCNTs or SWCNTs can be grown (only) in the exposed regions (50 µm×50 µm with 10 µm grid widths, in one experiment) not covered by the grid, with sharp transitions between the exposed and masked regions, as shown in photomicrographs in FIGS. 4A-4C. Alternatively, the mask may be formed using electron beam lithography, which allows formation of sharply defined apertures on a suitable substrate, with diameters as low as 20 nm, with an increase in available pattern detail. It is estimated that as many as $4\times10^6$ SWCNTs or MWCNTs will grow in a 50 µm×50 µm growth region, using hexagonal close packing and assuming a diameter of 20 nm, and that 1-4 SWCNTs or MWCNTs will grow in a 20 nm×20 nm growth region, where growth is not constrained or enhanced as discussed herein.

Figure 5A:
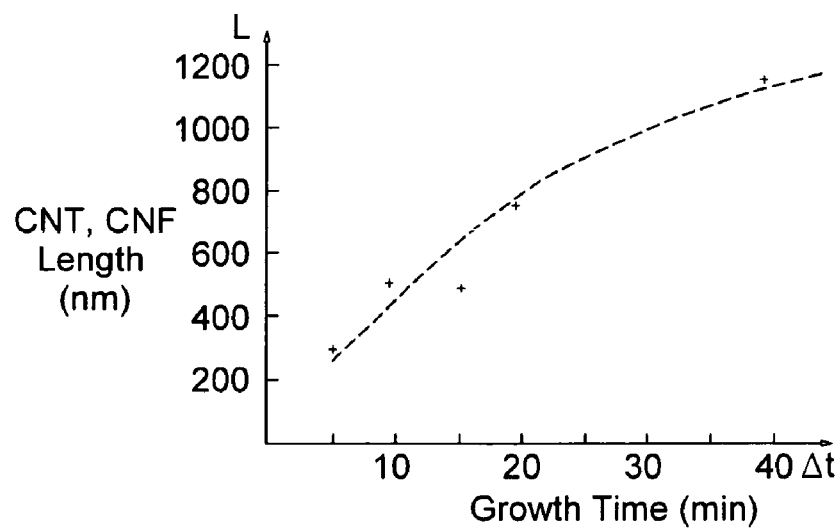
FIGS. 5A and 5B graphically illustrates growth in length with time of a CNT.
Figure 5B:
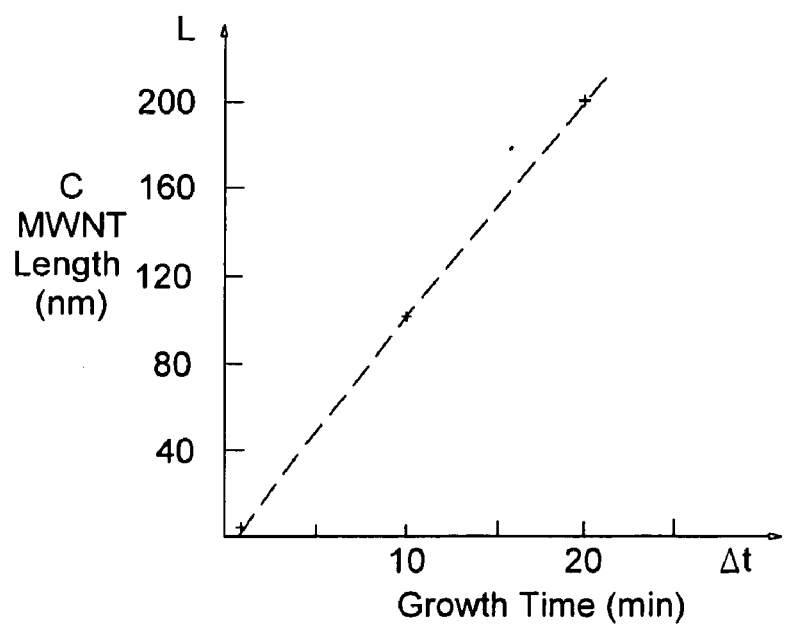
Figure 6A:
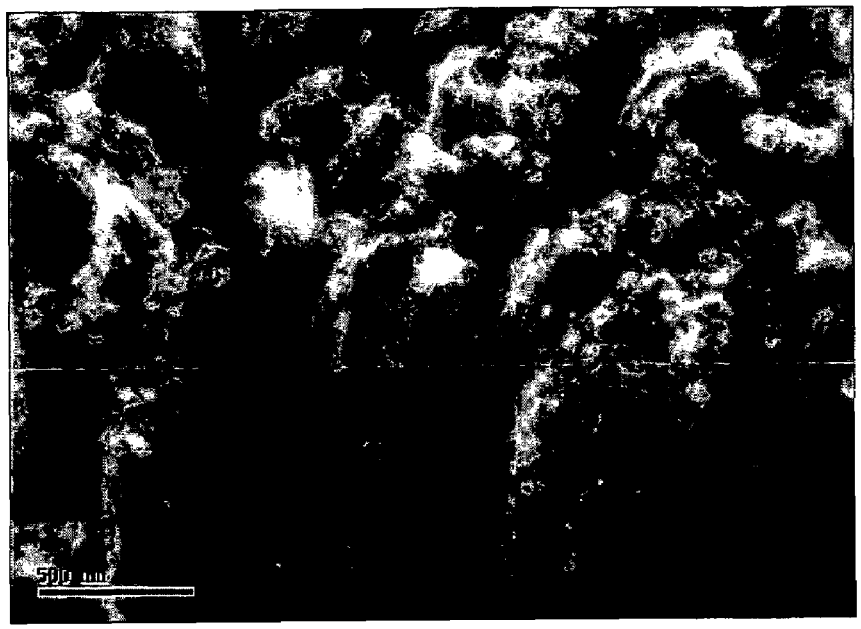
FIGS. 6A-6D are photomicrographs illustrating the effects of use of different capacitive power levels on growth of CNTs and CNFs.
Figure 6B:
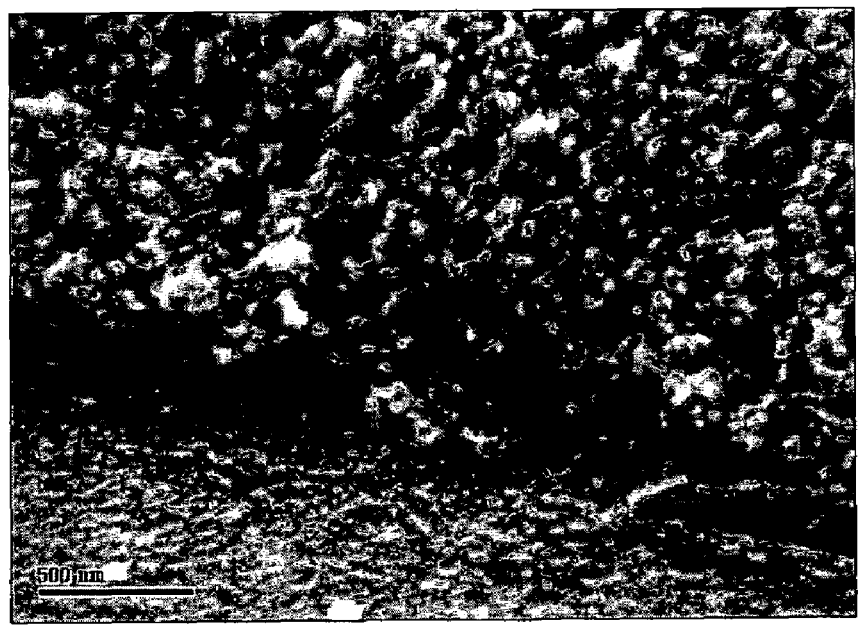
Figure 6C:
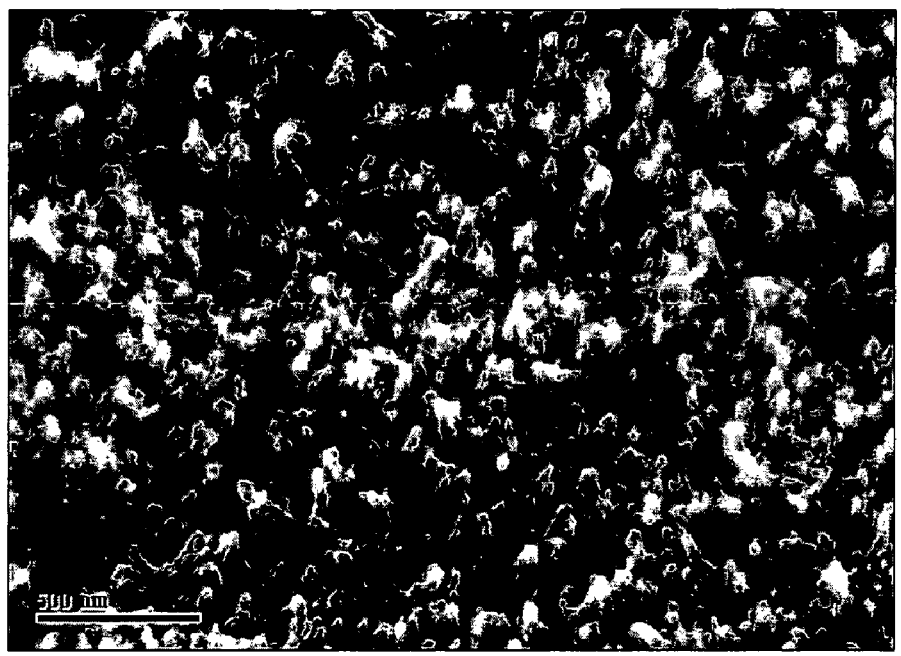
Figure 6D:

An MWCNT or CNF may be a substantially coaxial assembly of CNTs with a diameter depending upon the number of CNT layers (e.g., 2-50) that contribute to the MWCNT or CNF. A MWCNT or CNF with a sufficient number of layers is self-supporting and can provide a CNT tower with a height that can be seen by an un-aided eye (e.g., 0.1-1 mm). FIGS. 5A and 5B graphically illustrate some measured lengths of different CNTs, as a function of cumulative time of growth. Not all CNTs grow at the same rate, but FIG. 5A indicates that the CNT length often grows with time t approximately as $\{a+b(t-t_0)^\alpha\}$ with $\alpha<1$ (characteristic of a diffusion process) over relatively long time periods. An Ni catalyst appears to provide more uniform growth of an MWCNT than does an Fe catalyst.

A CNF has a substantially non-hollow core of graphitic carbon and is configured in one mode as a sequence of similar truncated cones of graphitic C that fit together in a substantially coaxial pattern resembling an MWCNT. Typically, a CNF has a cone apex angle of 10°-90°, has a diameter of 15-200 nm and may reach a maximum height of tens to hundreds of microns or more. The feed gas used to generate a CNF is typically $CH_4$, $C_2H_4$ or $C_2H_2$ in an appropriate temperature range.

Plasma-enhanced CVD (PECVD) or normal CVD has been used to grow CNTs on a two-layer, three-layer or four-layer structure, using various materials for the support layers, and electrical resistances have been measured for these structures. A support structure of Al/Fe/Mo, deposited using sputtering, allows CVD growth of SWCNTs having electrical resistance of about 22 kilo-ohms. Table 2 sets forth estimated electrical resistances for MWCNTs and CNFs grown using PECVD to provide the support structure. MWCNTs and CNFs can be grown using a plasma with or without using the Al/Ir layer shown in FIG. 2, but SWCNTs grown using a plasma may require this layer.

PECVD can also be used to form SWCNTs and MWCNTs with a modest number (2-5) of CNT walls. SWCNT growth is normally promoted by using a thinner catalyst layer and higher growth temperatures than the catalyst thicknesses and temperatures used for growth of CNFs and MWCNTs.

In any plasma discharge, change of the temperature, the pressure, the flow rate(s), the feed gas(es) and feed gas ratios, the method of initiating the plasma, sample pre-treatment, electrical bias, capacitive power, inductive power and/or catalyst will affect the type and quality of carbon nanotubes grown.

TABLE 2

Resistance Associated With PECVD-Grown MWCNTs and CNFs

| Support Structure | Resistance (Ohms) |
|---|---|
| Cr/Fe (MWCNT) | 345 |
| Cr/Al/Fe (CNF) | 460 |
| Pt/Al/Fe (MWCNT) | 70 |
| Ti/Fe (MWCNT) | 300 |
| W/Fe (MWCNT) | 22,000 |
| W/Fe (CNF) | 80 |
| W/Al/Fe (MWCNT) | 50 |
| Ni (CNF) | $\geq 2,000$ |
| Fe (CNF) | 5,000 |

FIGS. 6A, 6B, 6C and 6D illustrate a transition in the carbon nanotube structure for the respective capacitive power values of 20 W, 30 W, 40 W and 50 W, respectively. At 50 W, the carbon nanotubes appear to be substantially all CNFs. Changing the inductive power level in such a process has no substantial effect on the relative amounts of CNTs and CNFs grown in a plasma reactor environment.

From results produced by "scraping" an array of MWCNTs from the coated substrate, it appears that the MWCNTs are strongly attached to the coated substrate. This attachment may be Ohmic. When the coated substrate is scraped, the MWCNT arrays appear to come off as flakes, which is consistent with a base growth pattern, as opposed to a tip growth pattern.

FIGS. 4A, 4B and 4C are photomicrographs showing well defined carbon nanotube growth regions adjacent to mask edges, for a SWCNT, an MWCNT and a CNF, respectively. These images demonstrate that the (exposed) growth regions are more or less uniformly filled with carbon nanotubes and that, at a line between a growth region and a masked region, the concentration of carbon nanotubes changes abruptly from substantially zero in the masked region to a non-zero, approximately uniform value in the growth region.

Figure 7:
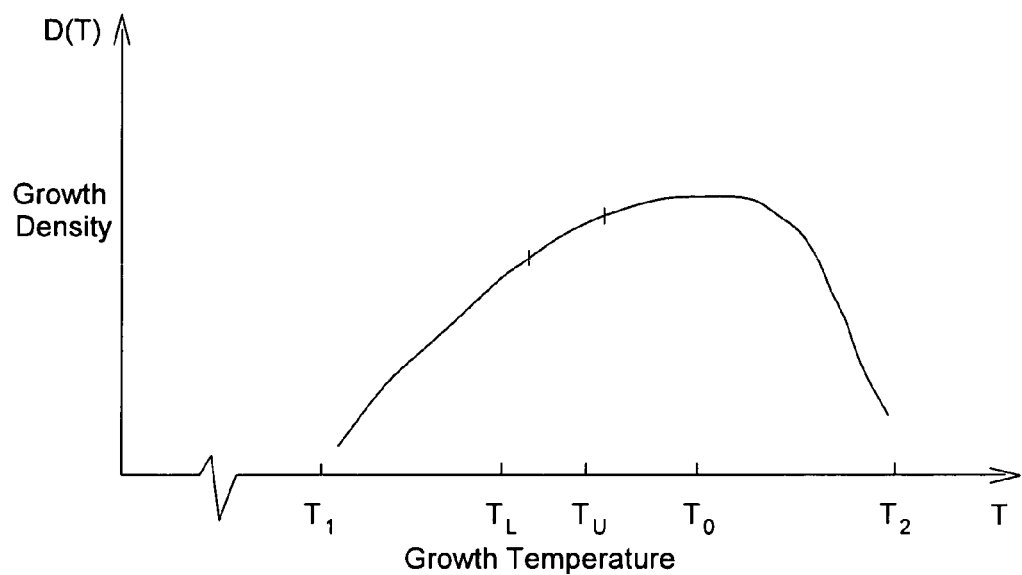
FIG. 7 is a representative curve of CNT growth density versus CNT growth temperature, manifesting a maximum density at an intermediate temperature.

FIG. 7 is an approximate graphical representation of average CNT growth density D(T) in a suitably prepared CNT growth region, as a function of growth temperature T. The growth density D(T) rises from a very small value (substantially 0) at a first temperature limit, $T=T_1$ to a maximum growth density value D(max) at an intermediate temperature, $T=T_0$, and decreases to a very small value (substantially 0) as the temperature increases further (above $T=T_0$) to a second temperature limit, $T=T_2$. Preferably, one operates in the temperature range $T_1 \leq T \leq T_0$, if only fine scale density control is of concern.

The density D of CNT growth illustrated in FIG. 7, expressed as a function of growth temperature T, can be approximated by a relation such as $$D(T;\text{app}) = a - b \cdot |T^q - T_0^q|^p, \quad (1)$$

where a, b, q and p are selected positive parameters that depend upon the particular growth process being used. As the exponent p increases, the curve in FIG. 7 becomes increasingly sharply curved or peaked near $T=T_0$. As the exponent difference $|q-1|$ increases from 0, the curve in FIG. 7 becomes increasingly non-symmetric about $T=T_0$. The approximation in Eq. (1) can be used to demonstrate some qualitative features of density difference over a region.

A density curve according to Eq. (1) will behave approximately as shown in FIG. 7, for a selected temperature range, such as $T_0 - \delta T \leq T \leq T_0 + \delta T$. The growth temperature T may not be precisely the same at all points in a region R and may have a small range, such as $T_1 < T_L \leq T \leq T_L + \Delta T = T_U < T_2$, with $T_0 - \delta T(\text{max}) < T_L < T_U \leq T_0$. Where the density function D(T) has a temperature slope (dD/dT) that decreases monotonically as T increases from $T_1$ to $T_0$, the maximum density – minimum density difference will decrease monotonically as $T_L$ increases, for fixed temperature difference $\Delta T$. This is also confirmed for the approximation D(T;app) in Eq. (1). For a fixed temperature uncertainty $\Delta T$, one has a maximum density uncertainty $\Delta D(\text{max})$ at or near the lowest temperature in the range, $T=T_1$, and the density uncertainty decreases substantially monotonically as $T_L$ increases toward $T_0 - \Delta T$.

If the desired CNT density range is to be relatively small, the growth temperature T in the region should be more tightly controlled so that the growth temperature difference $\Delta T$ can be reduced. One can use a selected temperature range (e.g., $T_L \leq T \leq T_0$) and lowest value ($T_L$) to vary the relative density of CNTs grown in a region, and one can thereby control the density difference or density uncertainty in this region on a relatively fine scale a factor of (2-10) by controlling the temperature difference, $\Delta T = T_U - T_L$.

In an earlier-filed patent application (U.S. Pat. No. 6,858, 197), Delzeit et al observed that growth of single wall CNTs (SWCNTs), multi-wall CNTs (MWCNTs) and carbon nanofibers (CNFs) may proceed under the following approximate environmental conditions:

SWCNTs: T=800-1100° C.; feed gas=$CH_4$;
MWCNTs: T=650-900° C.; feed gas=$C_2H_4$ of $C_2H_2$;
CNFs: T=400-900° C.; feed gas=$C_2H_4$ or $C_2H_2$.

Other feed gases containing C may also be suitable for such growth. Delzeit et al also observed that deposit of a catalyst layer of Fe, Co, Ni and/or Mo, of thickness 0.1-20 nm, on a substrate will promote the growth of a CNT array, especially in the absence of a supplemental layer of Al or Ir. Where the supplemental layer is too thin or is absent and no catalyst layer is present, few or no CNTs are likely to grow on the substrate, even with the right environmental conditions. It is likely that, as a lower limit for temperature is approached from above (e.g., T decreasing toward 800° C. for SWCNTs), the density of CNTs grown in an array will drop precipitously toward 0 as the lower limit is approached.

Delzeit et al also observed that use of the following, or a two-layer structure (e.g., Pt/Fe), or a three-layer structure (e.g., Pt/Al/Fe) on a substrate, used to grow CNF arrays, will provide CNF arrays with electrical resistances of about 30 Ohms and about 50 Ohms, respectively, whereas absence of the Pt layer will produce arrays with electrical resistances of 500-10,000 Ohms. The Wiedemann-Franz law in physics indicates that the ratio of thermal conductivity to electrical conductivity is approximately a constant (within a factor of about 3) across a variety of materials so that high thermal conductivity and high electrical conductivity tend to occur in the same material.

Figure 8:
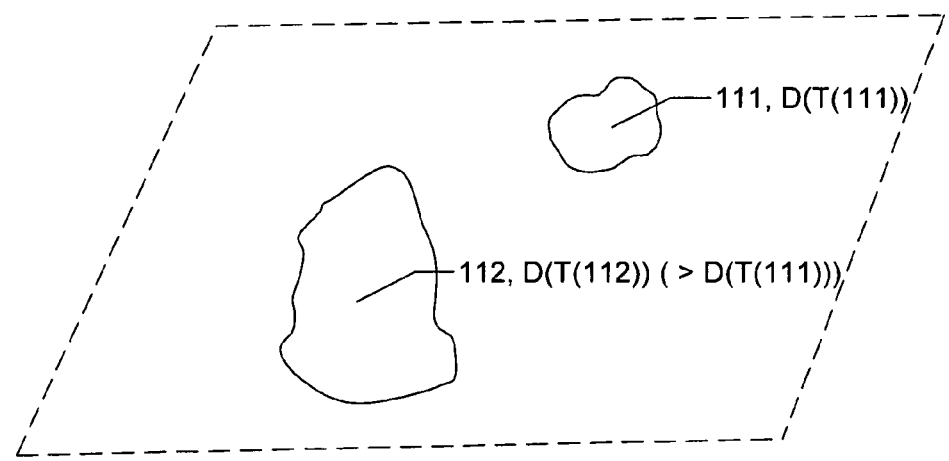
FIG. 8 schematically illustrates an effect of application of different temperatures to different CNT growth regions on a substrate.

FIG. 8 illustrates an application of the invention to density control for an electronic device or substrate 110, where a first region 111 requires that the local CNT growth temperature be no more than about T(111) (e.g., with $T_1 \approx T(111) = 500°$ C.), with associated CNT growth density of $D(T_1)$ and a spaced apart second region 112 requires a CNT array with a larger CNT growth density $D(T_2)$, corresponding to a higher temperature $T_2 \approx T(112)$ (e.g., $T(112) = 700°$ C.) that is substantially greater than $T_1$, but less than $T_2$. CNT growth at a first temperature T(111) proceeds as indicated in the preceding so that the entire substrate has (at least) a first CNT density of approximately D(T(111)), corresponding to the temperature T=T(111). Simultaneously or subsequently, the second region 112 is preferentially heated to a higher second or augmented temperature, $T=T_2$, using a local resistive or inductive heater, a focused laser beam, a focused particle beam or a similar localizable heating source. In the second region 112, the CNT density is approximately $D(T_2)$, corresponding to the augmented temperature $T_2$, as discussed in the preceding. This approach can be used to provide a CNT density $D(T_n)$ (n=1, ..., N; N≧2) in each of N spaced apart regions using localizable heating sources for each region where the CNT growth temperature in other regions is to be substantially larger than the base growth temperature ($T_1$) used for the remainder of the substrate 110.

The approach illustrated in FIG. 8 can be applied to vary the CNT density in different regions of a substrate: (1) to control or vary thermal transport from different regions of the substrate (or device on a substrate); (2) to control or vary transport of electrically charged particles (or to vary electrical resistance) from different regions of the substrate; and (3) to vary or control a material property that is analogous to thermal transport or electrical transport from different regions of a substrate.

The invention provides a procedure for varying the CNT density D(T) in one or more regions of a substrate on which the CNTs are grown, by varying the local temperature and/or the local electrical field applied within each of these regions.

For a growth temperature range, $T_L \leq T \leq T_U$, of reasonable thermal width, such as $\Delta T = T_U - T_L = 50°$ C., and a reasonable end-to-end width (e.g., 200° C.), the CNT growth density curve in FIG. 7 permits a "fine scale" variation in CNT growth density by a factor of 2-10 (estimated), by variation of a central temperature, $T_c \approx (T_L + T_U)/2$. It may be unreasonable to expect to hold the growth temperature range to within a width less than about $\Delta T = 50°$ C. However, if a smaller thermal width can be maintained, the fine scale control (precision) of CNT density is improved accordingly.

A coarse scale control of CNT density is also available, extending over densities of 1-3 orders of magnitude, by imposing an electrical field of modest field strength E in a direction substantially perpendicular to a plane defined by a catalyst layer or substrate surface. A development in Appendix 1 indicates that the phase space probability associated with CNT growth density ρ varies exponentially with ρ, for fixed electrical field strength E. A modest change in the electric field magnitude |E| or in the voltage difference V (for fixed electrode spacing) may change the CNT growth density by 1-3 orders of magnitude or more so that one also has in hand a "coarse scale" adjustment for CNT growth, namely modest adjustment of the longitudinal electrical field strength E or of the voltage difference V.

Figure 9:
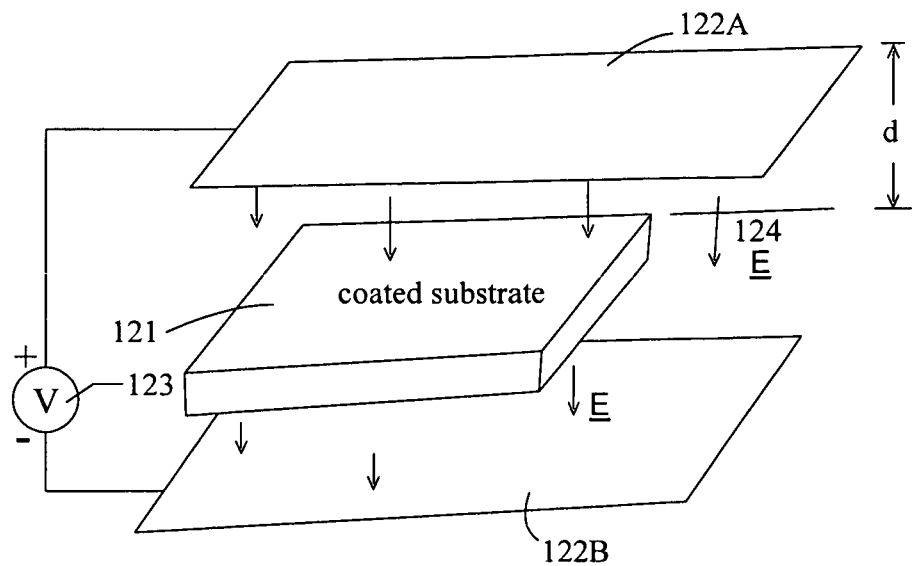
FIGS. 9 and 10 illustrate systems for implementing coarse scale CNT density control.

FIG. 9 illustrates an embodiment where a CNT growth density decrease by several powers of ten (e.g., 1-3) has been achieved, using a modest voltage difference. A substrate 121, having a thin metal catalyst surface (e.g., Fe, Ni, Co or Mo) is located close to one or more substantially planar metal surfaces, 122A and 122B, but transversely spaced apart from the catalyst-coated surface by a small distance d, such as d=d1≈25 μm. A small voltage difference, such as V=5-20 volts, is applied to the two metal surfaces by a voltage source 123, and a plurality of electrical field lines 124 ("E1") develops between these two surfaces, as illustrated schematically in FIG. 9. Close or adjacent to the interior of the catalyst-coated substrate surface, the E-field lines are oriented substantially perpendicular to this surface and have a modest curvature; any CNTs grown in this interior region will grow in an electrical field with substantially perpendicular E-field vectors. In an earlier technical article, "Directed Growth Of Single-Walled Carbon Nanotubes", *Intl. Jour. of Nanotechnology*, vol. 1 (2002) pp. 197-204, presented by L. Delzeit et al, this configuration was found to produce catalyst coating islands of reduced diameter and reduced connectivity when a non-zero voltage difference is imposed between the electrodes, 122A and 122B. Reduced catalyst coating connectivity and reduced CNT growth density appear to arise from imposition of the substantially perpendicular E-field adjacent to the substrate surface.

Figure 10:
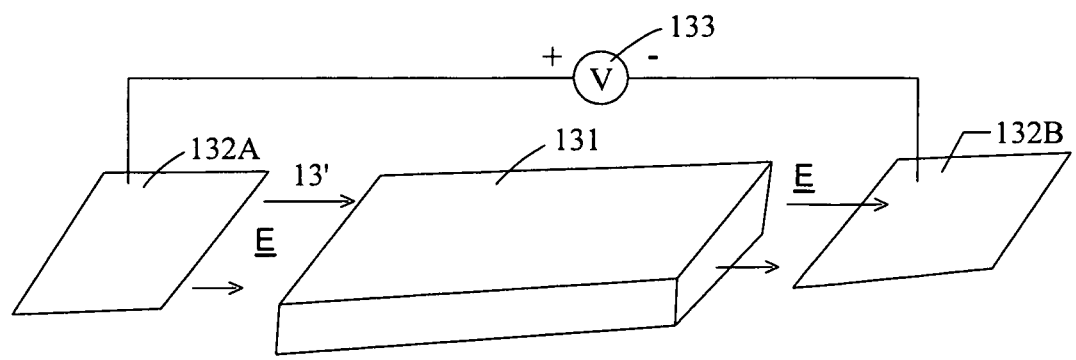

The configuration in FIG. 9, with two transversely spaced apart electrode plates, can be replaced by a catalyst-coated substrate 131 and two longitudinally spaced apart electrode plates, 132A and 132B, and a voltage source 133, as illustrated in FIG. 10, where the near-perpendicular orientation of the E-field lines 134 ("E3") near the CNT growing surface of the substrate 131 is preserved. With a separation distance, d=d2≈25 μm and a voltage difference V=5-20 volts, the CNT growth density should again be reduced by one or more orders of magnitude, relative to the CNT growth density with no voltage difference applied.

Beginning with a nominal CNT growth density D0, which results from growth with zero base electrical field ($E_b=0$) imposed (which may be 0) and a nominal CNT growth temperature range, $T_{nom}$ in $T_1 \leq T \leq T_2$, one provides a desired CNT growth density D1, which is normally, but not necessarily, less than D0. The quantity $\log_A\{D0/D1\}$ for a selected logarithmic base A, preferably with A≧2 (e.g., A=2, e=2.718282, √10=3.167, 4, 5, 8, 10, 16, √1000=31.67) is expressed as $$\log_A\{D0/D1\}=X+Y, \quad (2)$$

$$Y=\log_A\{D0/D1\}-X, \quad (3)$$

where X is approximately an integer (normally ≧0) and Y is a fraction having a magnitude no greater than about 1 (−1<Y<1). The integer X indicates the approximate number of orders of magnitude (powers of A) by which the nominal density D0 is to be reduced in order to achieve a density D1' that differs from D1 by less than one "order of magnitude." The fraction Y indicates the further decrease (Y≧0) or increase (Y<0), preferably by a multiplicative factor less than A, by which the intermediate density D1' must be further modified to achieve the desired density D1. With a non-zero base electrical field $E_b$ imposed and the nominal temperature range, $T_1 \leq T \leq T_2$, used for CNT growth, the resulting CNT growth density value is about $$D1' = D0 \cdot A^{-X}. \quad (4)$$

With no electrical field imposed and an adjusted temperature range, $T_L \leq T \leq T_U$, used for CNT growth, the resulting CNT growth density value is about $$D1'' = D0 \cdot A^{-Y}. \quad (5)$$

More generally, for N distinct regions (N≧2), one begins with a nominal density value D0 and provides a desired density D1(n) for region no. n (n=1, ..., N). Preferably, D1(n)≦D0. By analogy with Eq. (2), define $$\log_A\{D0/D1(n)\} = X(n) + Y(n), \quad (6)$$

$$Y(n) = \log_A\{D0/D1(n)\} - X(n), \quad (7)$$

where the values X(n) and Y(n) are analogous to X and Y, respectively.

A first density change D0–D1'(n) is preferably achieved by application of a non-zero base electrical field $E_b$ oriented substantially perpendicular to the catalyst-coated substrate surface, where $E_{n2}$ may (but need not) differ from $E_{n2}$ if n1≠n2. Another density change D0–D1"(n), which can be up or down, is preferably achieved by choice of an adjusted temperature range, $T_{L(n)} \leq T \leq T_{U(n)}$, to replace the nominal temperature range, $T_1 \leq T \leq T_2$, for CNT growth, with no electrical field imposed, where the nominal temperature range and the adjusted temperature range may partly overlap or may be non-overlapping. That is, the nominal temperature range is adjusted up or down, in accordance with the tendencies shown in FIG. 7, according to whether Y(n)<0 (increase in density) or Y(n)≧ 0 (decrease in density). Imposition of a non-zero, substantially perpendicular base electrical field and replacement of the nominal temperature range by the adjusted temperature range have substantially independent effects in CNT growth.

Optionally, the regions (n=1, ..., N) with different densities D1(n) can be chosen so that the lower temperatures TL(n) satisfy $$T_{L(1)} \leq T_{L(2)} < \ldots \leq T_{L(N)} \quad (8)$$

so that the low end temperatures for each range increase monotonically. This sequence permits an overall temperature to increase monotonically as the different density regions are fabricated. Where two low end temperatures, $T_{L(k)}$ and $T_{L(k+1)}$, are equal, the corresponding upper end temperatures are accounted for by requiring that $$T_{U(k)} \leq T_{U(k+1)} \quad (9)$$

Figure 11:
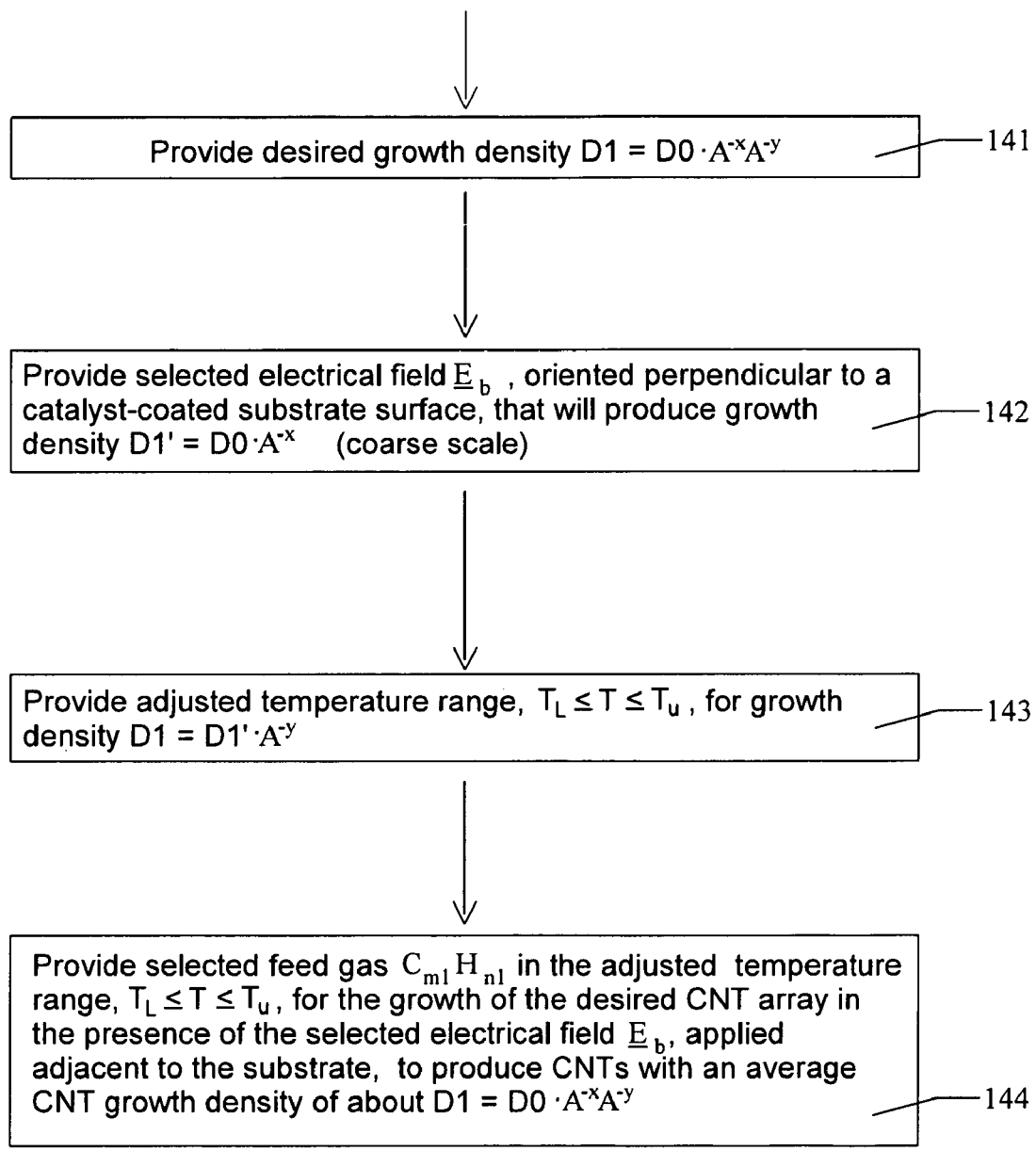
FIGS. 11 and 12 are flow charts illustrating a procedure for implementing combined coarse scale and fine scale CNT growth density control.
Figure 12:
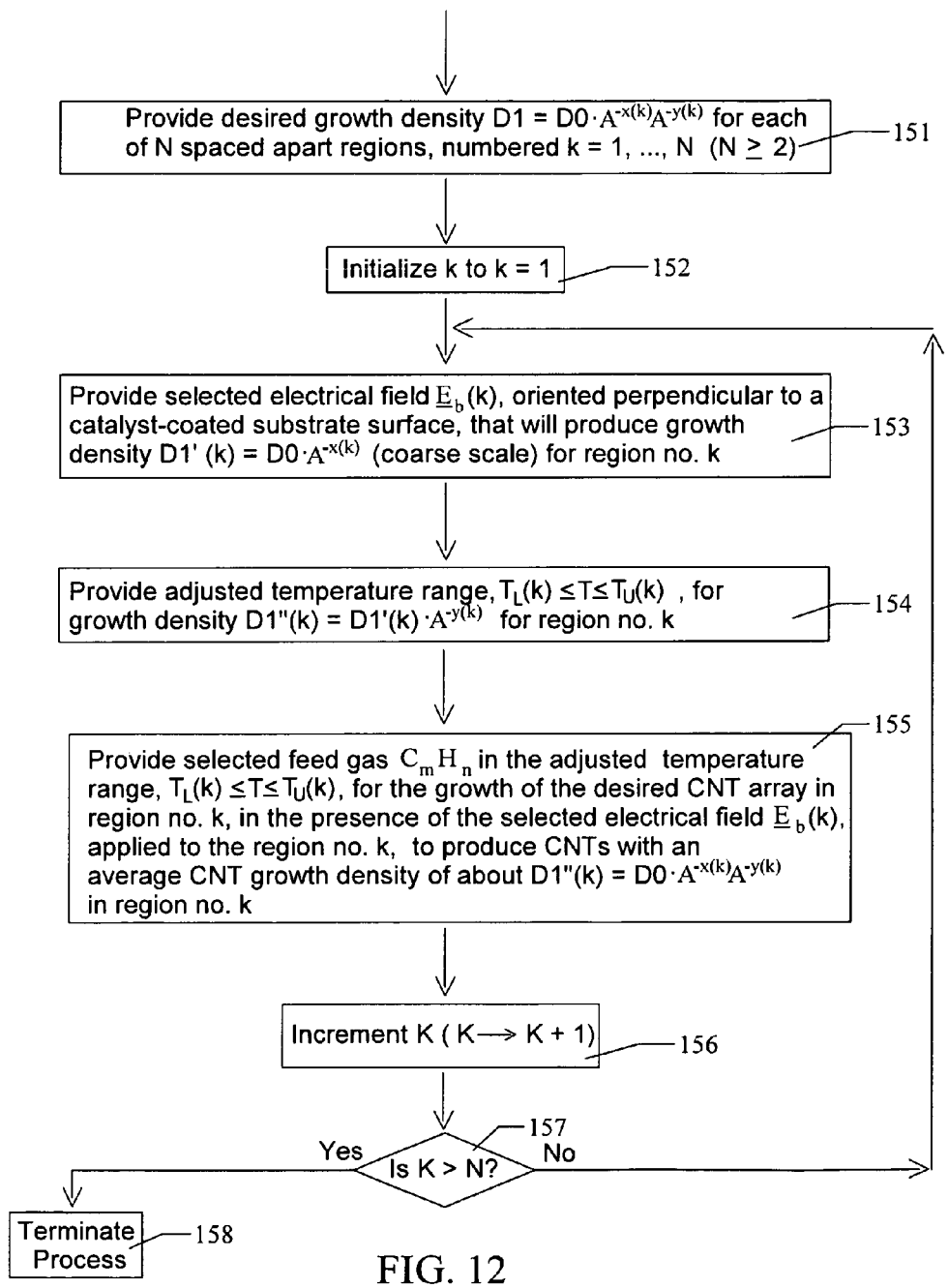

Combined use of fine scale control and of coarse scale control for CNT growth density is illustrated in a flow chart in FIG. 11, for a single specified growth density, and in FIG. 12, for a plurality of specified growth densities. In step 141 in FIG. 11, a specification of desired CNT growth density is provided, as $D1 = D0 \cdot A^{-X} A^{-Y}$, where D0 is a nominal or average CNT growth density for a nominal CNT growth temperature range, $T_1 \leq T \leq T_2$, with no electrical field applied at the substrate, X is approximately an integer (positive, negative or zero), and $Y = \log_A\{D0/D1\} - X$ is a fraction satisfying |Y|<1.

In step 142, a base electrical field value $E_b$, oriented substantially perpendicular to a catalyst-coated surface of the substrate, is provided, which would produce a first intermediate density $D1' = D0 \cdot A^{-X}$ (coarse scale), using the nominal CNT growth temperature range. In some instances, $E_b = 0$.

In step 143, a (fine scale) adjusted temperature range, $T_L \leq T \leq T_U$, for CNT growth density is provided, where use of the adjusted temperature range for CNT growth density $D1 = D1' \cdot A^{-Y}$, with no perpendicular electrical field imposed at the substrate, would produce a second intermediate CNT growth density value of about $D1'' = D0 \cdot A^{-Y}$. In many instances, steps 142 and 143 can be applied in any order.

In step 144, a selected feed gas $C_{m1}H_{n1}$ is supplied in the adjusted temperature range, $T_L \leq T \leq T_U$, for growth of a CNT array, in the presence of a base electrical field $E_b$, applied adjacent to the substrate, and CNTs having a average growth density of about $D1 = D0 \cdot A^{-X} A^{-Y}$ are grown on the substrate. In many instances, application of the base electrical field and use of the adjusted temperature range have substantially independent effects on the CNT growth density.. However, in some instances, application of an E-field and application of an adjusted temperature range may be non-commutative.

The coarse scale control plus fine scale control procedures can also be applied to control of N distinct CNT growth densities in N spaced apart regions (N≧2), as illustrated in the flow chart in FIG. 12. In step 151 in FIG. 12, a specification of CNT growth density is provided, as $D1(k) = D0 \cdot A^{X(k)} A^{Y(k)}$, for region number k=1 ..., N (N≧2), where D0 is a nominal or average CNT growth density, X(k) is approximately an integer (positive, negative or zero) for region no. k, and Y(k)= $\log_A\{D0/D1'(k)\} - X(k)$ is a fraction satisfying |Y(k)|<1.

In step 153, a selected electrical field value $E_n(k)$, oriented substantially perpendicular to a catalyst-coated surface of the substrate, is associated with region k, which would produce a first intermediate density $D1'(k) = D0 \cdot A^{-X(k)}$ in the region k, using the nominal CNT growth temperature range, $T_1 \leq T \leq T_2$. In some instances, $E_n = 0$ (no voltage difference).

In step 154, a (fine scale) adjusted temperature range, $T_{L(n)} \leq T \leq T_{U(n)}$, is associated with region k, where use of the adjusted temperature range for CNT growth, with no perpendicular electrical field imposed at the substrate, would produce a second intermediate CNT growth density value of about $D1''(k) = D0 \cdot A^{-Y(k)}$ in the region k. In many instances, steps 153 and 154 can be applied in any order for a specific region k.

In step 155, a first feed gas $C_m H_n$ is supplied for growth of a CNT array in region no. k. Optionally, a different feed gas is supplied for growth, or supplemental growth, of a CNT array in each region, where one or more characteristics (e.g., SWCNT or MWCNT or CNF) of the different regions may be (but need not be) different from each other. Optionally, feed gases for two or more regions are the same. In step 156, the appropriate feed gas(es) is supplied to the region number k in the adjusted temperature range, $T_{L(k)} \leq T \leq T_{U(k)}$, the electrical field $E_n$ is applied at the region number k, and CNTs with an average growth density of about $D1(k) = D0 \cdot A^{-X(k)} A^{-Y(k)}$, are grown in the region k=1, ..., N. Optionally, the regions k=1, ..., N are indexed so that the lower limit temperatures satisfy $T_{L(k)} \leq T_{L(k+1)}$ (k=1, ..., N−1)

The preceding procedures in FIGS. 11 and 12 facilitate control of CNT growth density as coarse scale growth density control (expressible roughly in powers of A) and fine scale growth density control (expressible as a multiplicative factor, a real number between 1 and A), through combined use of imposition of a selected electrical field, oriented perpendicular to a catalyst-coated surface of the substrate, and imposition of a selected temperature range (preferably, relatively narrow) for CNT growth. This control can be extended from a single region to N regions (with N≧2) by separate control of the electrical field strength $E_n$ and of the growth temperature range, $T_{L(n)} \leq T \leq T_{U(n)}$.

Figure 13A:
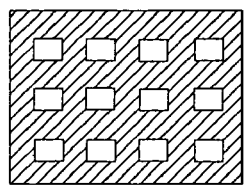
FIGS. 13A-13K display some catalyst patterns and CNT growth patterns, producible according to the invention.
Figure 13B:
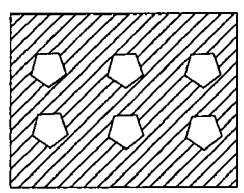
Figure 13C:
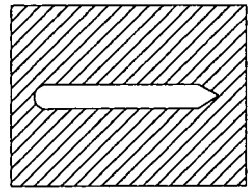
Figure 13D:
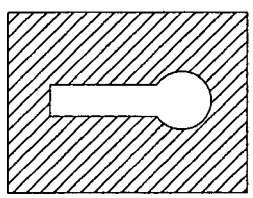
Figure 13E:
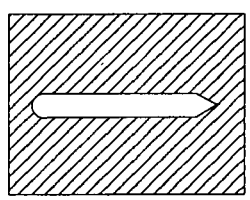
Figure 13F:
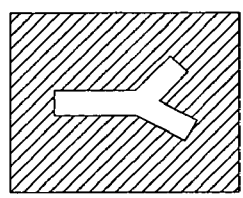
Figure 13G:
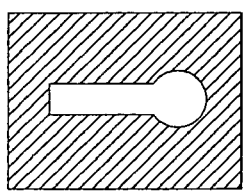
Figure 13H:
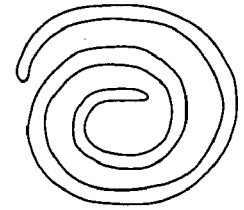
Figure 13I:
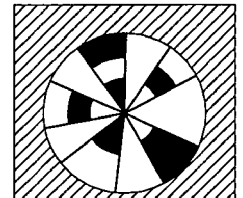
Figure 13J:
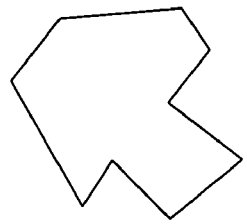
Figure 13K:
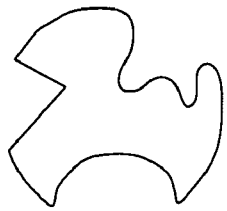

FIGS. 13A-13K illustrate some catalyst patterns that can be set down and for which the coarse scale/fine scale procedures discussed herein can be applied. FIGS. 13A and 13B illustrate periodic (or, optionally, non-periodic) patterns using regular (or, optionally, non-regular) polygons, such as quadrilaterals and pentagons. FIGS. 13C, 13D, 13E, 13F and 13G illustrate geometric characters, such as an arrow (13C), a keyhole (13D), a letter "L" or its reverse (13E), the letter "Y" (13F), and the numeral "8" (13G). FIG. 13H illustrates a spiral and FIG. 13I illustrates a circle or oval with complex sector patterning within. FIGS. 13J and 13K illustrate a non-regular (and non-convex) polygon and a non-regular curvilinear polygon.

Appendix 1. Estimation of Electrical Field Alignment Effect(s) On CNT Growth Density Consider an array of CNTs grown in a heaxagonal close packed area pattern as shown in FIG. 13 for ease of discussion. Assume that the CNT array is grown in the presence of a non-zero electrical field E (assumed uniform initially) that is oriented substantially perpendicular to a catalyst or substrate surface. Because of the longitudinal field E imposed on the CNT array, each CNT in this region will have an approximately uniform, non-zero electrical charge $\chi e$ induced at the exposed end of the CNT. A central site CS in the array will be surrounded by: (1) a first perimeter P(1) containing 6 other CNT sites, each located at a distance r from CS; (2) a second perimeter P(2) containing 12 other CNT sites, each located at a distance 2r from CS; . . . ; and (M) an mth perimeter P(M) (not shown for M>2) containing 6·M other CNT sites, each located at a distance M·r from CS. The interaction force between the induced charge at CS and the similar charge induced at the surrounding 3M(M+1) sites can be expressed as $$\Sigma(E;CS) = E_0 r_0^2 \{6/r^2 + 12/(2r)^2 + 18/(3r)^2 + \ldots + (6 \cdot M)/(Mr)^2\} \approx 6 E_0 r_0^2 \{1n(M) + \gamma\}/r^2, \quad \text{(A-1)}$$

where $E_0$ (proportional to electrical field strength) and $r_0^+$ are values with appropriate units and $\gamma(\approx 0.577\ldots)$ is the Euler-Mascheroni constant. The area density of CNTs on the site S as shown is $$\rho = \text{area density} = \{1 + 6 \cdot 1 + 6 \cdot 2 + 6 \cdot 3 + \ldots + 6 \cdot M\}/\{(\sqrt{3}/4) M^2 r^2\} \approx (4\sqrt{3})/r^2, \quad \text{(A-2)}$$

for sufficiently large values of M. Equation (A-1) may be restated as $$\Sigma(E;CS) \approx (2\sqrt{3}) E_0 r_0^2 \{1n\{M\} + \gamma\} \rho, \quad \text{(A-3)}$$

which establishes an approximate relationship between area density $\rho$ and the interaction between induced charges on neighboring CNTs. If this computation is repeated for each hexagon node in the array in FIG. 11 (taking care not to double count), the total interaction of induced charges on the CNT exposed ends will have an approximate form $$\Sigma(E;\text{total}) \approx (2\sqrt{3}) E_0 r_0^2 \{a(M) \cdot 1n\{M\} + \gamma\} \rho, \quad \text{(A-4)}$$

where the function a(M) is weakly dependent upon M, and thus upon the diameter of the site S.

The phase space probability function associated with the induced electrical charge interactions will have an approximate form $$Pr(E) \propto \exp\{-\Theta \Sigma(E;\text{total})\} = \exp\{-\Theta \cdot F \cdot \rho\}, \quad \text{(A-5)}$$

where $\Theta$ is a factor depending upon the ambient environment (e.g., temperature, surface coating material) and F is a value proportional to field strength magnitude or strength (|E|) and weakly dependent upon the diameter of the site S. Thus, for a fixed electrical field strength |E|, the phase space probability decreases exponentially with increasing area density.

The preceding development assumes presence of a close packed hexagonal CNT array, which arguably (1) is the most efficient array pattern and (2) has the smallest total interaction energy associated with the array pattern. The actual pattern will likely differ from a hexagonal close packed pattern and will thereby have a greater total interaction $\Sigma(E;\text{total})$ and a smaller phase space probability function Pr(E), with a dependence upon average area density that is qualitatively similar to the conclusions drawn from Eq. (A-5).

What is claimed is:

1. A method for control of growth density of carbon nanotubes on a substrate, the method comprising:

providing a substrate, with at least one surface coated with a catalyst that enhances growth of carbon nanotubes ("CNTs") thereon;

providing a nominal or average growth density value D0 for carbon nanotubes ("CNTs") grown in a nominal temperature range, $T_1 \leq T \leq T_2$, and a desired CNT growth density value D1, with $D1 \leq D0$;

representing a logarithm of a ratio of average growth density value D0 divided by desired growth density value D1 as a value $\log_A\{D0/D1\} = X+Y$, where X is approximately an integer and $Y = \log_A\{D0/D1\} - X$ has a magnitude |Y| no greater than about 1, where A is a selected logarithm base value at least equal to about 2;

imposing an electrical field having a value $E = E_b$ adjacent to the catalyst-coated substrate surface, where the field is oriented substantially perpendicular to the catalyst-coated substrate surface and adjacent to the substrate surface, for which imposition of the electrical field $E_b$ and growth of the CNTs in the nominal temperature range, $T_1 \leq T \leq T_2$, will produce CNTs having an average growth density of $D1' \approx D0 \cdot A^{-X}$;

providing at least one feed gas comprising $C_{m1}H_{n1}$, where $m1 \geq 1$ and $n1 \geq 2$, adjacent to the substrate, where the at least one feed gas is heated to a temperature T within an adjusted temperature range, $T_L \leq T \leq T_U$, having a lower temperature value $T_L$ and an upper temperature range $T_U$ that is at least equal to $T_L$, for which growth of CNTs in the adjusted temperature range with no electrical field imposed will produce CNTs having an average growth density of $D1'' \approx D0 \cdot A^{-Y}$; and transporting the heated feed gas across the catalyst-coated surface, allowing at least a portion of the heated feed gas to decompose to provide two or more C particles, and allowing at least a portion of the C particles to form an array of CNTs having an average CNT density of about D1 in a selected region R1 of the catalyst-coated substrate surface.

2. The method of claim 1, further comprising:

providing a nominal CNT growth density value $D0 = D(|E|=0, T_1 \leq T \leq T_2)$ greater than said density value D1, for an array of CNTs grown, using said feed gas heated in a second selected temperature range, $T_1 \leq T \leq T_2$, with no electrical field imposed at said catalyst-coated substrate surface; and choosing said base electrical field magnitude $|E_b|$ so that said average CNT growth density $D(|E_b|, T_L \leq T \leq T_U)$ satisfies $$|\log_A\{(D(|E_b|, T_L \leq T \leq T_U)/D0)\}| \leq 1.$$

3. The method of claim 1, further comprising choosing said temperature range $T_1 \leq T \leq T_2$) to be included in a temperature range 650° C.$\leq T \leq$1100° C.

4. The method of claim 1, further comprising choosing said feed gas to include at least one of $CH_4$, $C_2H_4$ and $C_2H_2$.

5. The method of claim 1, further comprising choosing said value A from the group of values consisting of A=2, 2.71828, 3.167, 4, 5, 8, 10, 16 and 31.67.

6. A method for control of growth density of carbon nanotubes on each of N regions, numbered n=1, ..., N (N$\geq$2) on a substrate, the method comprising:

providing a substrate, with at least one surface coated with a catalyst that enhances growth of carbon nanotubes ("CNTs") thereon;

providing a nominal or average growth density value D0 for carbon nanotubes ("CNTs") grown in a nominal temperature range, $T_1 \leq T \leq T_2$, and a desired CNT growth density value D1(n) for region number n, with D1(n)$\leq$D0, where for at least two regions, number n1 and n2, D1(n1)$\neq$D1(n2);

representing a logarithm of a ratio of average growth density value D0 divided by desired growth density value D1(n) as a value $\log_A\{D0/D1(n)\} = X(n) + Y(n)$, where X(n) is approximately an integer and $Y(n) = \log_A\{D0/D1(n)\} - X(n)$ has a magnitude |Y(n)| no greater than about 1, where A is a selected logarithm base value at least equal to about 2;

imposing an electrical field having a value $E = E_b(n)$ adjacent to and in the regions number n=n1 and n=n2, where the field is oriented substantially perpendicular to the catalyst-coated substrate surface and adjacent to the substrate surface, for which imposition of the electrical field $E_b(n)$, and growth of the CNTs in the nominal temperature range, $T_1 \leq T \leq T_2$, will produce CNTs having an average growth density of $D1'(n) \approx D0 \cdot A^{-X(n)}$;

for at least the first and second regions, number n1 and n2, providing at least a first feed gas comprising $C_{m1}H_{k1}$, and a second feed gas comprising $C_{m2}H_{k2}$, respectively, where m1$\geq$1, m2$\geq$1, 2$\leq$k1$\leq$2m1+1 and 2$\leq$k2$\leq$2m2+2, adjacent to the substrate, where each of the first and second feed gases is heated to a temperature T within an adjusted temperature range, $T_{L(n)} \leq T \leq T_{U(n)}$, having a lower temperature value $T_{L(n)}$ and an upper temperature range $T_{U(n)}$ that is at least equal to $T_{L(n)}$, for which growth of CNTs in the adjusted temperature range with no electrical field imposed for regions n=n1 and n=n2 will produce CNTs having an average growth density of $D1''(n) \approx D0 \cdot A^{-y(n)}$, and where the first feed gas and the second feed gas may be the same or may differ from each other;

transporting the heated first feed gas and the heated second feed gas across the regions n=n1 and n=n2, respectively, allowing at least a portion of the heated first feed gas and the second feed gas to decompose to provide two or more C particles, and allowing at least a portion of the C particles to form an array of CNTs having an average CNT density of about D1(n) in the regions number n=n1 and n=n2, respectively, of the substrate surface.

7. The method of claim 6, further comprising:

providing a nominal CNT growth density value D0=D (|E|=0,$T_1 \leq T \leq T_2$) greater than said density value D1(n), for an array of CNTs grown in at least one of said regions number n, using said first feed gas heated in said temperature range, $T_1 \leq T \leq T_2$, with no electrical field imposed at said substrate surface; and choosing said base electrical field magnitude $|E_b(n)|$ so that said average CNT growth density $D(|E_b(n)|, T_{L(n)} \leq T \leq T_{U(n)})$ satisfies $|\log_A\{D(|E_b(n)|, T_{L(n)} \leq T \leq T_{U(n)})/D0)\}| \leq 1$.

8. The method of claim 6, further comprising choosing said temperature range $T_1 \leq T \leq T_2$) to be included in a temperature range 650° C.$\leq T \leq$1100° C.

9. The method of claim 6, further comprising choosing at least one of said first feed gas and said second feed gas to include at least one of $CH_4$, $C_2H_4$ and $C_2H_2$.

10. The method of claim 6, further comprising choosing said value A from the group of values consisting of A=2, 2,71828, 3.167, 4, 5, 8, 10, 16 and 31.67.

11. The method of claim 1, further comprising choosing said first and second feed gases to be the same feed gas.

12. The method of claim 6, further comprising choosing said first feed gas to be different from said second feed gas.

13. The method of claim 6, further comprising providing said first feed gas at said temperature in said range $T_{L(n1)} \leq T \leq T_{U(n1)}$, in said region n1, and subsequently providing said second feed gas at said temperature in said range $T_{L(n2)} \leq T \leq T_{U(n2)}$ in said region n2, where $T_{L(n1)} \leq T_{L(n2)}$.

14. The method of claim 13, further comprising providing said first feed gas at said temperature in said range $T_{L(n1)} \leq T \leq T_{U(n1)}$, in said region n1, and subsequently providing said second feed gas at said temperature in said range $T_{L(n2)} \leq T \leq T_{U(n2)}$ in said region n2, where $T_{L(n1)} = T_{L(n2)}$ and $T_{U(n2)} \leq T_{U(n1)}$.

* * * * *